(12) United States Patent
Taniguchi et al.

(10) Patent No.: US 7,650,369 B2
(45) Date of Patent: Jan. 19, 2010

(54) DATABASE SYSTEM MANAGEMENT METHOD AND DATABASE SYSTEM

(75) Inventors: Kazuhiro Taniguchi, Kawasaki (JP);
Teruyuki Goto, Kawasaki (JP);
Toshihide Matsuda, Kawasaki (JP);
Kenji Kawana, Kawasaki (JP); Yuuji Itou, Kawasaki (JP); Ryo Matsumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 262 days.

(21) Appl. No.: 11/716,094

(22) Filed: Mar. 9, 2007

(65) Prior Publication Data
US 2007/0233699 A1 Oct. 4, 2007

(30) Foreign Application Priority Data
Mar. 30, 2006 (JP) .............................. 2006-094195

(51) Int. Cl.
*G06F 17/30* (2006.01)
(52) U.S. Cl. ...................................... 707/202; 711/162
(58) Field of Classification Search ......... 707/200–205; 711/162
See application file for complete search history.

(56) References Cited

U.S. PATENT DOCUMENTS

| 7,266,718 | B2* | 9/2007 | Idei et al. ........................ 714/6 |
| 7,472,173 | B2* | 12/2008 | Maruyama et al. .......... 709/219 |
| 7,512,755 | B2* | 3/2009 | Iwamura et al. ............. 711/161 |
| 2005/0160312 | A1* | 7/2005 | Seng et al. .................... 714/13 |
| 2005/0210073 | A1* | 9/2005 | Oeda et al. .................. 707/200 |
| 2006/0026452 | A1* | 2/2006 | Suzuki et al. .................. 714/2 |
| 2007/0088737 | A1* | 4/2007 | Kawakami et al. .......... 707/102 |

FOREIGN PATENT DOCUMENTS

JP 2004-348701 12/2004
JP 2005-157897 6/2005

* cited by examiner

*Primary Examiner*—Debbie M Le
(74) *Attorney, Agent, or Firm*—Greer, Burns & Crain, Ltd.

(57) ABSTRACT

A control device 10 at a main center, in order for an update carried out in an operation database device M to be also conducted in an operation database device S at a sub-center, generates and transmits a differential log file 16 to a control device 20 at the sub-center. The control device 20 at the sub-center, when receiving a differential log file 22, updates the operation database device S on the basis of the log information in the differential log file 22, and accumulates the log information in a recovery log file 26. The log information of a recovery point set at the main center is incorporated into this recovery log file 26.

5 Claims, 14 Drawing Sheets

FIG. 4

14:RECOVERY LOG FILE

| LOG TYPE | TRANSACTION ID | ... | COMMIT TIME |
|---|---|---|---|
| AI | T1 | ... | – |
| AI | T1 | ... | – |
| AI | T1 | ... | – |
| AI | T2 | ... | – |
| AI | T3 | ... | – |
| R | T3 | ... | – |
| AI | T1 | ... | – |
| C | T1 | ... | T1-C |
| C | T2 | ... | T2-C |
| RP | – | ... | – |
| AI | T4 | ... | – |
| C | T4 | ... | T4-C |

FIG. 8

23a: EXTRACTIN FILE

| LOG TYPE | TRANSACTION ID | ... | COPY SOURCE TRANSACTION ID | COMMIT TIME |
|---|---|---|---|---|
| ES | - | ... | - | Tk-C |
| ... | ... | ... | ... | ... |
| AI | T1 | ... | T1 | T1-C |
| AI | T1 | ... | T1 | T1-C |
| AI | T1 | ... | T1 | T1-C |
| C | T1 | ... | - | T1-C |
| AI | T2 | ... | T2 | T2-C |
| C | T2 | ... | - | T2-C |
| RP | - | ... | - | - |
| AI | T4 | ... | T4 | T4-C |
| C | T4 | ... | - | T4-C |
| ... | ... | ... | ... | ... |
| EE | - | ... | - | Tn-C |

FIG. 10

26: RECOVERY LOG FILE

| LOG TYPE | TRANSACTION ID | ... | COPY SOURCE TRANSACTION ID | COMMIT TIME |
|---|---|---|---|---|
| ES | - | ... | - | Tk-C |
| ... | ... | ... | ... | ... |
| AI | Ta1 | ... | T1 | T1-C |
| AI | Tb1 | ... | T1 | T1-C |
| AI | Tc1 | ... | T1 | T1-C |
| C | Tb1 | ... | - | Tb1-C |
| AI | Ta1 | ... | T1 | T1-C |
| AI | Ta1 | ... | T2 | T2-C |
| C | Ta1 | ... | - | Ta1-C |
| C | Tc1 | ... | - | Tc1-C |
| RP | - | ... | - | - |
| AI | Ta2 | ... | T4 | T4-C |
| C | Ta2 | ... | - | Ta2-C |
| ... | ... | ... | ... | ... |
| EE | - | ... | - | Tn-C |
| ES | - | ... | - | Tm-C |
| ... | ... | ... | ... | ... |

14:RECOVERY LOG FILE

| LOG TYPE | TRANSACTION ID | ... | COMMIT TIME |
|---|---|---|---|
| AI | T1 | ... | - |
| AI | T1 | ... | - |
| AI | T1 | ... | - |
| AI | T2 | ... | - |
| AI | T3 | ... | - |
| R | T3 | ... | - |
| AI | T1 | ... | - |
| C | T1 | ... | T1-C |
| C | T2 | ... | T2-C |
| AI | T4 | ... | - |
| C | T4 | ... | T4-C |

FIG. 13

23a: EXTRACTION FILE

| LOG TYPE | TRANSACTION ID | ... | COPY SOURCE TRANSACTION ID | COMMIT TIME |
|---|---|---|---|---|
| ES | - | ... | - | Tk-C |
| ... | ... | ... | ... | ... |
| AI | T1 | ... | T1 | T1-C |
| AI | T1 | ... | T1 | T1-C |
| AI | T1 | ... | T1 | T1-C |
| C | T1 | ... | - | T1-C |
| AI | T2 | ... | T2 | T2-C |
| C | T2 | ... | - | T2-C |
| AI | T4 | ... | T4 | T4-C |
| C | T4 | ... | - | T4-C |
| ... | ... | ... | ... | ... |
| EE | - | ... | - | Tn-C |

FIG. 14

26:RECOVERY LOG FILE

| LOG TYPE | TRANSACTION ID | ... | COPY SOURCE TRANSACTION ID | COMMIT TIME |
|---|---|---|---|---|
| ES | - | ... | - | Tk-C |
| ... | ... | ... | ... | ... |
| AI | Ta1 | ... | T1 | T1-C |
| AI | Tb1 | ... | T1 | T1-C |
| AI | Tc1 | ... | T1 | T1-C |
| C | Tb1 | ... | - | Tb1-C |
| AI | Ta1 | ... | T1 | T1-C |
| AI | Ta1 | ... | T2 | T2-C |
| C | Ta1 | ... | - | Ta1-C |
| C | Tc1 | ... | - | Tc1-C |
| ... | ... | ... | ... | ... |
| EE | - | ... | - | Tn-C |
| ES | - | ... | - | Tm-C |
| ... | ... | ... | ... | ... |

DATABASE SYSTEM MANAGEMENT METHOD AND DATABASE SYSTEM

BACKGROUND OF THE INVENTION

1. Field of the Invention

The present invention relates to a method of managing a database system configured by a plurality of database devices and to a database system for actualizing this operation method.

2. Related Background Art

As known well, for storing a large quantity of operation data generated through daily operations on terminal computers, a database device is generally utilized. Further, for preventing a loss of the operation data due to a natural disaster, a power failure or a system fault, separately from a database device provided at main center for storing the operation data, a replica of this database device is prepared at a sub-center in a remote place to back up the operation data.

Further, the replica may be operated as a secondary database device for the case the database device at the main center becomes unusable, so that the operations on the terminal computers can be continued by using the database device in the sub-center as current movement database device instead of the database device at main center in that case until the database device at the main center is restored. However, when the current movement database device is changed from the database device at the main center to the database device at the sub-center due to occurrence of disaster, a transaction from which the executing of the operation is to be restarted among the series of the transaction constituting the operation must be matched up to the operation data from which new pieces of operation data is to be overwritten after the operation restarts among the series of the operation data stored in the database device in order of their generation.

Note that if an operation mode for backup is an asynchronous mode, because executing result of the same transaction is reflected asynchronously in database devices of each center, there is a time difference between the update of the same operation data in the database device at the main center and that in the database device at the sub-center. Hence, in switching the current movement database device after occurrence of disaster, as a matter of course, it is required that the matching process described above is carried out (refer to, e.g., Japanese Patent Application Laid-Open Publication No. 2004-348701). On the other hand, even if the operation mode is a synchronous mode, because executing result is reflected synchronously in database devices of each center, consistency between the update of the same operation data in the database device at the main center and that in the database device at the sub-center is assured. However, in case each operation consists of plural pieces of transaction which are continually executed as one unit, if the database device at the main center falls during execution of one operation, the transaction which was committed before down in the main center is also committed in a sub-center, but, it must be confirmed which pieces of transaction have been committed among a series of transaction in the broken operation. Moreover, to continue remaining transactions except committed transaction, a system operator needs to make some manipulation such as the input commands to execute the remaining transaction by handwork or making an exclusive program to start the transaction is necessary, which impose the system operator excessive task. Therefore it is common that pieces of operation data of committed transaction among a series of transactions of the broken operation is delete from the database device at the sub-center and the same operation is re-started. However, in this case, it must be confirmed which transactions have been committed among a series of transaction. Therefore, even if the operation mode is the synchronous mode, it is required that the matching process described above is carried out.

The matching process described above has hitherto been executed by collating journal data left in each terminal computers with the operation data already stored in the database device at the sub-center. However, this matching process is extremely time-consuming. It therefore follows that a long period of time is expended from occurrence of disaster until resuming storing the database device at the sub-center with the operation data.

Note that there is recovery technology to return a state of operation data in a database device to a certain past state. Recovery of a database device is performed with a recovery log file. The recovery log file stores log records in which information to specify a transaction is associated with time and date when its corresponding transaction is executed and committed and with an updated operation, respectively. Moreover, a recovery point for specifying an operation to be re-executed is inserted in one of the intervals between log records stored in order of the time and date. To perform recovery of a database device, a system operator designates one of the recovery points in the recovery log file and starts a well-known recovery function, so that the system operator can return a state of operation data in a database device to a state at the time when the recovery point was set.

As described above, in case the database device at the main center gets unusable, the transactions on the terminal computers must be matched up to the operation data in the database device at the sub-center before the resumption of storing the operation data to the database device at the sub-center as current movement database device. Here, for facilitating returning a state of operation data in the database device at sub-center to a certain past state before occurrence of disaster, recovery of the database device at the sub-center may be enabled by adding a recovery function to the database device at main center and the database device at the sub-center and by transferring a copy of information in a recovery log file of main center into sub-center.

However, whether the operation mode for backup is the asynchronous mode or the synchronous mode, execution and commit of same transaction are performed at main center and sub-center individually, so that time and date of execution and commit of transaction performed at the main center is recorded in the recovery log file of the main center, time and date of execution and commit of transaction performed at the sub-center is recorded in the recovery log file of the sub-center. Therefore, even if a copy of the information in the recovery log file of the main center is transferred into sub-center, the recovery function at sub-center cannot be performed normally in the sub-center (refer to, e.g., Japanese Patent Application Laid-Open Publication No. 2005-157897). As a result, recovery point set in the recovery log file of the main center cannot be performed normally at sub-center.

Therefore, such a problem arises that the matching process cannot be performed by use of the recovery point in case of disaster.

Further, in case the database device at the main center is restored, for the resumption of storing the operation data to the database device at the main center as current movement database device, it is necessary to transfer (mirror) the operation data accumulated in the database device at the sub-center to the database device at the main center, and to perform the matching up the operation data accumulated in the database device at the main center to one in the database device at the sub-center. However, in such matching process, it is required that all the items of operation data in the database device at the sub-center be copied to the database device at the main center. In the case of copying all of a large quantity of data held by the database device, the database device must be stopped. Therefore, there is a problem that the operation on the terminal computers must be interrupted for a long period of time before the resumption of storing the operation data to the restored database device at the main center. To resolve the problem, it is devised such a method that the database device at the main center is temporarily configured as a replica of the database device at the sub-center, and the current movement database device is returned from the database device at the sub-center to the database device at the main center. However, with this method, an interruption period of the operation for switching over the current movement database device can be decreased, but the problem that all the items of operation data in the database device at sub-center must be copied to the database device at the main center cannot be resolved.

SUMMARY OF THE INVENTION

It is an object of the present invention, which was devised in view of the problems inherent in the prior arts described above, to enable the current movement database device to be promptly switched over to the database device at the sub-center when the database device at the main center becomes unusable, and not to need to copy all the items of operation data when switching over the current movement database device back to the database device at the main center after being restored.

To accomplish the above object, according to a first mode of the present invention devised to solve the problems given above, a database system management method for managing a database system configured by a main center system having a first processing device which generates operation data by executing transaction constituting an operation according to request that has been sent via a network from any one of operation terminal computers in a normal state and having a first database device which stores the operation data or updates the stored data by new operation data at every time when new operation data are generated, and a sub-center system having a second processing device and a second database device respectively having same functions as that the first processing device and the first database device have, the method comprising a first log information generating step in which the first processing device generates, whenever the operation data are updated within the first database device, its log information as first log information, an incorporating step in which the first processing device incorporates predetermined first delimiter information into an interval between two consecutive arbitrary pieces of first log information generated in the first log information generating step, a transmitting step in which the first processing device transmits the series of first log information into which the delimiter information is incorporated in the incorporating step to the second processing device, an updating step in which the second processing device divides the series of first log information transmitted in the transmitting step into plural groups and executes, for each of plural groups, update of the operation data stored in the second database device on the basis of the respective first log information constituting the group, a second log information generating step in which the second processing device generates, whenever the operation data are updated in the second database device in the updating step, its log information as second log information, and a storing step in which the second processing device incorporates second delimiter information associated with the first delimiter information into an interval corresponding to the interval within the series of second log information generated in the second log information generating step and stores the series of the second log information in which the second delimiter information is incorporated.

With this configuration, the second delimiter information associated with the first delimiter information is incorporated into the series of the second log information. The interval in which the second delimiter information is incorporated corresponds to the interval in which the first delimiter information is incorporated into the series of first log information. Therefore, system operator can perform easily, by using the first delimiter information, the matching the operation on terminal computers to the operation data accumulated in the second database device. It should be noted that the database device at the main center described above may execute as the first database device in a normal state and, after switching over the current movement database device, may execute as the second database device. Namely, the same action according to the first mode of the present invention can be utilized for the recovery conducted in the database device at the sub-center when the database device at the main center becomes unusable due to a disaster etc and for the recovery performed in the database device at the main center when restoring the database device at the main center.

Further, according to a second mode of the present invention devised to solve the problems described above, a database system management method for operating a database system configured by a main center system having a first processing device which generates operation data by executing transaction constituting an operation according to request that has been sent via a network from any one of operation terminal computers in a normal state and having a first database device which stores the operation data or updates the stored data by new operation data at every time when new operation data are generated, and a sub-center system having a second processing device and a second database device respectively having same functions as that the first processing device and the first database device have, the method comprising, a first log information generating step in which the first processing device generates, whenever the operation data are updated within the first database device, its log information as first log information, a transmitting step in which the first processing device transmits the pieces of first log information generated in the first log information generating step to the second processing device, an updating step in which the second processing device updates the operation data in the second database device on the basis of the first log information transmitted in the transmitting step, a second log information generating step in which the second processing device generates, whenever the operation data are updated in the second database device in the updating step, its log information as second log information, and an associating step in which the second processing device associates the second log information generated in the second log information generating step with the first log information by adding time information contained in the first log information to each piece of second log information.

With this configuration, the second log information includes time information same as time information that is included in first log information corresponding to this second log information. Therefore, in the case of switching over the current movement database device to the second database device from the first database device, system operator can perform easily, by using the time information within the second log information indicating time when the operation data in the first database device is updated, matching the operation on terminal computers to the operation data stored in the second database device. It should be noted that the database device at the main center described above may execute as the first database device in the normal state and, after switching over the current movement database device, may execute as the second database device. Namely, the same action according to the second mode of the present invention can be utilized for the recovery conducted in the database device at the sub-center when the database device at the main center becomes unusable due to the disaster etc and for the recovery performed in the database device at the main center when restoring the database device at the main center.

Still further, according to a third mode of the present invention devised to solve the problems described above, a database system configured by a main center system having a first processing device which generates operation data by executing transaction constituting an operation according to request that has been sent via a network from any one of operation terminal computers in a normal state and having a first database device which stores the operation data or updates the stored data by new operation data at every time when new operation data are generated, and a sub-center system having a second processing device and a second database device respectively having same functions as that the first processing device and the first database device have, the first processing device comprising, a first log information generating unit generating, whenever the operation data are updated within the first database device, its log information as first log information, a incorporating unit incorporating predetermined first delimiter information into an interval between two consecutive arbitrary pieces of first log information generated by the first log information generating unit, and a transmitting unit transmitting the series of first log information into which the delimiter information is incorporated by the incorporating unit to the second processing device, and the second processing device comprising, an updating unit dividing the series of first log information transmitted by the transmitting unit into plural groups and executing, for each of plural groups, update of the operation data stored in the second database device on the basis of the respective first log information constituting the group, a second log information generating unit generating, whenever the operation data are updated in the second database device by the updating unit, its log information as second log information, and a storing unit incorporating second delimiter information associated with the first delimiter information into an interval corresponding to the interval within the series of second log information and storing the series of the second log information in which the second delimiter information is incorporated.

Accordingly, it follows that the present database system functions in the same as the database system in which the database system management method according to the first mode of the present invention described above is actualized.

As explained above, according to the present invention, it is possible to promptly switch over the current movement database device to the database device at the sub-center when the database device at the main center becomes unusable, and to provide the scheme having no necessity of copying all the items of operation data when switching over the current movement database device back to the database device at the main center after being restored.

BRIEF DESCRIPTION OF THE SEVERAL VIEWS OF THE DRAWING

FIG. 4 is a table showing one example of a data structure of a recovery log file of the main center;

FIG. 8 is a view of one example of a data structure of an extraction file;

FIG. 10 is a table showing one example of a data structure of a recovery log file of the sub-center;

FIG. 13 is a view of one example of the data structure of the table of the extraction file; and FIG. 14 is a table showing one example of the data structure of the recovery log file of the sub-center.

DETAILED DESCRIPTION OF THE PREFERRED EMBODIMENT

Next, a best mode embodiment for carrying out the present invention will hereinafter be described in detail with reference to the accompanying drawings.

To start with, architecture of a database system in the present embodiment will be explained.

Figure 1:
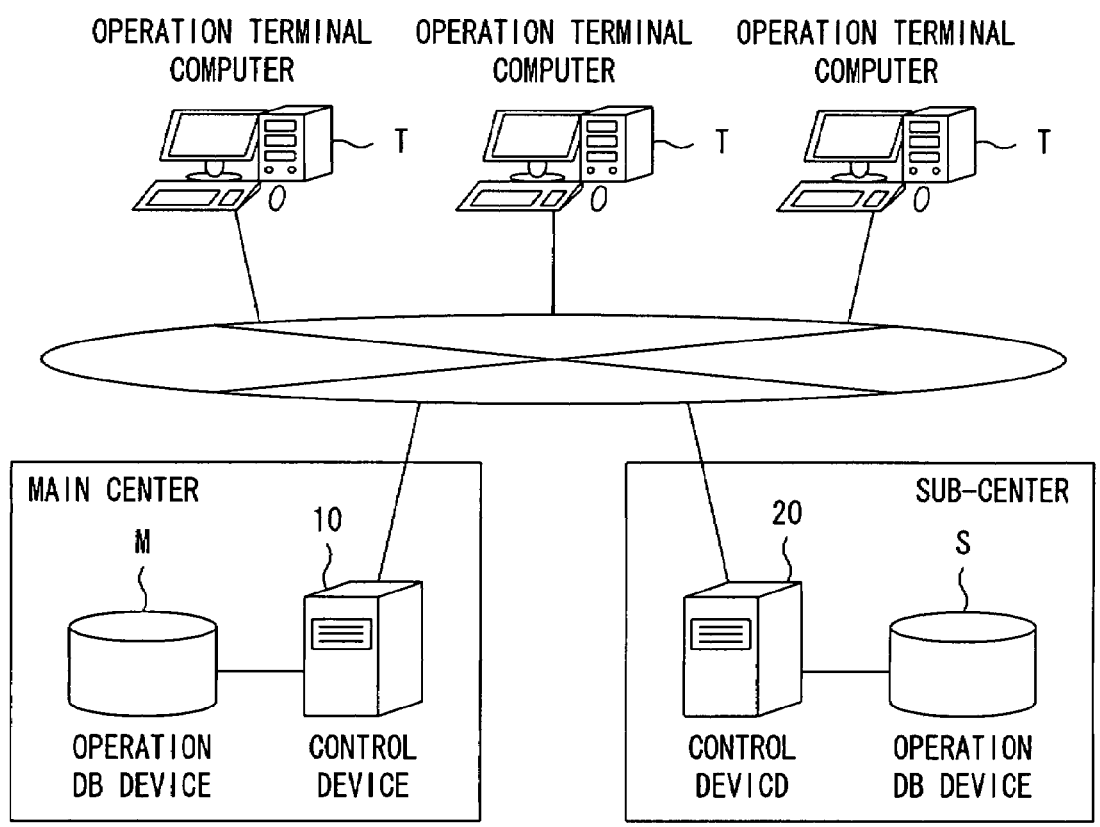
FIG. 1 is a diagram showing architecture of a database system in the present embodiment.

FIG. 1 is a diagram showing the architecture of the database system in the present embodiment.

As shown in FIG. 1, the database system in the present embodiment is constructed of a plurality of operation terminal computers T, a control device 10 connected to an operation database device M within a main center, and a control device 20 connected to an operation database device S within a sub-center. These devices T, 10, 20 are connected to each other in a communicable manner via a network.

Among these devices, the operation terminal computer T is a device for transmitting a request for executing a variety of transactions to the control devices 10, 20 via the network. The operation terminal computer T is a general type of personal computer installed with well-known software for operating the personal computer as the operation terminal.

Each of the operation database devices M, S is a device including a function of accumulating operation data acquired through processes executed by the control devices 10, 20 on the basis of the request given from the operation terminal computer T. Each of the database devices M, S is a general computer including a database table stored with the operation data and installed with well-known software for actualizing a function of adding, deleting, changing and searching for the operation data in this database table. Note that database device M, S may include only one database function realized by the database table and the software or may include plural database functions each having its exclusive database table. In case database device M, S include plural database functions, those database functions are installed in each partitions to which an area of storage of the general computer is divided.

Each of the control devices 10, 20 is a device for controlling input and output of the operation data to and from the operation database devices M, S. These control devices 10, 20 have a function of operating the operation database devices M, S managed by the control devices 10, 20 themselves as current movement database devices or replicas for backup in accordance with an operation mode. In the case of operating its local operation database devices M, S as the current movement database device, the control devices 10, 20 execute a transaction in response to a request given from the operation terminal computer T, then update the operation data within the local operation database device M, S based on processing result to commit the transaction, and notify the operation terminal computer T of information on the processing result. On the other hand, in the case of operating its local operation database device M,S as the replica for backup, the control devices 10, 20 acquire commands of the transaction as information about the update conducted by the operation database device M,S as the current movement database devices and update in the same way the operation data within the local operation database device M,S based on executing and committing the transaction with the cooperation of the control device of the operation database device M,S as the current movement database device.

It should be noted that the database system in the present embodiment is, in a normal status, set so that the operation database device M within the main center is operated as the current movement database device while the operation database device S within the sub-center is operated as the replica for backup. Further, the database system in the present embodiment is set so that in a status where the operation database device M within the main center becomes unusable due to a natural disaster, a service interruption or a system fault, the operation database device S within the sub-center is operated as the current movement database device. The sub-center may also be installed in a remote place from the main center so that the both of the centers are not affected at the same time by the natural disaster etc.

Figure 2:
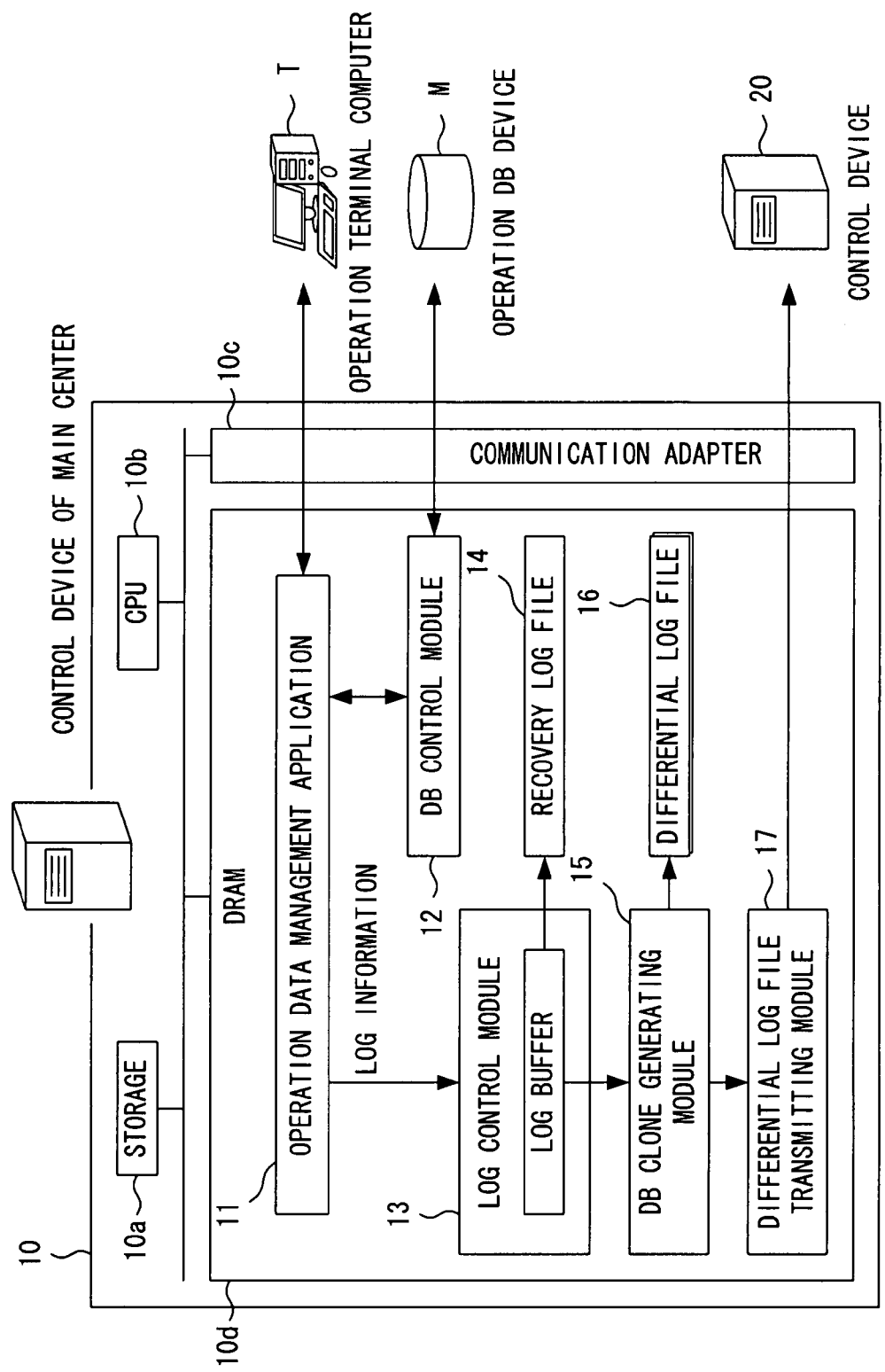
FIG. 2 is a diagram showing a configuration of a control device within a main center.

FIG. 2 is a diagram showing a configuration of the control device 10 within the main center. Further, FIG. 3 is a diagram showing a configuration of the control device 20 within the sub-center.

Figure 3:
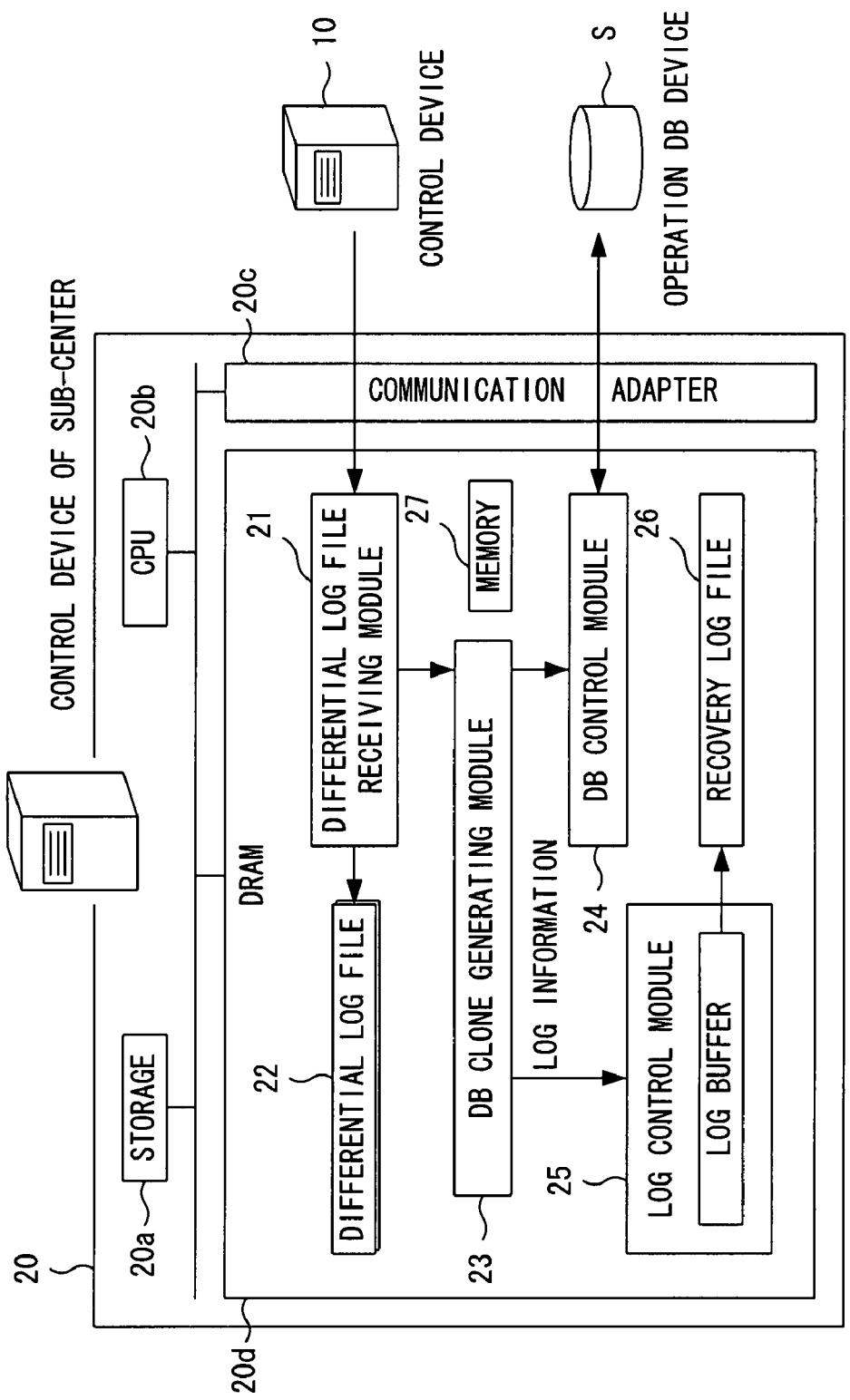
FIG. 3 is a diagram showing a configuration of a control device within a sub-center.

As depicted in FIGS. 2 and 3, the general-purpose computers configuring the control devices 10, 20 have, as well-known built-in hardware components, storages 10a, 20a, CPUs (Central Processing Units) 10b, 20b, communication adaptors 10c, 20c, and DRAMs (Dynamic Random Access Memories) 10d, 20d. The storages 10a, 20a are installed with well-known operation data management application software 11 for transferring and receiving the operation data to and from the operation terminal computer T, well-known database control module programs 12, 24 for controlling the input/output of the operation data to and from the operation database devices M, S, well-known log control module programs 13, 25 for generating log information used for recovering the operation data within the operation databases M, S, and module programs 15, 17, 21 for generating and handing over the information for update of the operation database as the current movement database device to the replica. These pieces of software and module programs are read from the storages 10a, 20a and developed on the DRAMs 10d, 20d to be executed by the CPUs 10b, 20b.

Note that FIG. 2 shows only the software 11 and the modules 12, 13, 15 17, which function within the control device 10 in the normal status where the operation database device M within the main center operates as the current movement database device. Further, FIG. 3 illustrates only the modules 21, 23, 24, 25 functioning mainly within the control device 20 in the normal status where the operation database device S within the sub-center operates as the replica for backup.

In the control device 10 (FIG. 2) on the side of the current movement database device in the normal status, the operation data application 11, when receiving the request from the operation terminal computer T, instructs the operation database device M to add, delete, or change of or search for the operation data on the basis of the transaction in a way that links up with the database control module 12. Further, the operation data management application 11 generates the log information with respect to execution and commitment (that is to reflect executing result on the operation data in the database device M) of the transaction. Note that if the database device M includes plural database functions, the same number of pieces of log information as the number of the updated database table is generated. Then, those log information generated by the operation data management application 11 are handed to the log control module 13. Moreover, the operation data management application 11, when instructed by a user to insert a recovery point via the operation terminal computer T, hands over information indicating this recovery point as log information of dummy to the log control module 13. Note that the process through which the operation data management application 11 generates the log information with respect to the update corresponds to a first log information generating step according to the present invention. Further, the process through which the operation data management application 11 generates the log information indicating the recovery point corresponds to an incorporating step according to the present invention. The log control module 13 generates one recovery log file 14 on the basis of all of the log information received from the operation data management application 11.

FIG. 4 is a table showing one example of a data structure of the recovery log file 14.

As shown in FIG. 4, each record which is defined as a "log record" in the table of the recovery log file 14 is recorded with respective log information and has fields such as "log type", "transaction ID", . . . , and "commit time". The "log type" field is a field recorded with types of the log information recorded in the log record. To be specific, this "log type" field is recorded with "AI" representing that the log information is an after-image (AI) (that is operation data updated by committing transaction) log, "R" representing that the log information is a roll-back (R) log, "C" representing that the log information is a commit (C) log, and "RP" representing that the log information is a recovery point. The "transaction ID" field is a field recorded with transaction IDs to identify each transaction from one another. Note that, in the table shown in FIG. 4, there are some log records having the same transaction ID. It is because, if the database device has plural database functions, executing result of execution of one transaction indicated by one transaction ID may be reflected on plural database tables of plural database functions, in this case, record of update of the operation data in each database table is gathered as one log record. The "commit time" field is a field recorded with time and date when commit (that is to reflect executing result on the operation data within the operation database M) of the transaction was performed. With respect to the log information other than those having the log type "C", "null" is entered in the "commit time" field of corresponding log record. Note that the table of the recovery log file 14 has, though not illustrated, a field stored with data utilized by each transaction and a field stored with an image (that is AI itself) of the operation data in the operation database device M updated through execution and commit of each transaction.

Further, the log control module 13 generating the recovery log file 14 as shown in FIG. 4 is prepared with a log buffer as a cache area for temporarily saving the log information received from the operation data management application 11. A database clone generating module 15 generates a differential log file 16 defined as information necessary for executing and committing (updating the replica-side operation database device S) the same transaction on the basis of the log information in the log buffer. Note that fields which log records within this differential log file 16 may be a little different from fields which log records within the recovery log file 14, but log records within the differential log file 16 have fields same as fields shown in FIG. 4 among fields which log records within recovery log file 14 have. The database clone generating module 15 hands over the differential log file 16 to a differential log file transmitting module 17. The differential log file transmitting module 17 transmits the differential log file 16 received from the database clone generating module 15 to the replica-sided control device 20 (FIG. 3). Note that this transmission involves using a general file transfer function or a general storage mirror function. Further, the process through which the differential log file transmitting module 17 transmits the differential log file 16 corresponds to a transmitting step according to the present invention.

On the other hand, in the replica-sided control device 20 in the normal status (FIG. 3), a differential log file receiving module 21 receives a differential log file 22 from control device 10 as the current movement database device and hands over the differential log file 22 to a database clone generating module 23. Note that a content of a process executed by the CPU 20b according to the database clone generating module 23 will be explained later on. The database clone generating module 23 reconstructs transaction based on log information (except log information indicating recovery point) in the differential log file 22 and instructs the operation database device S to add, delete and change the operation data on the basis of commit of the reconstructed transaction in a way that links up with a database control module 24. It should be noted that the process through which the database clone generating module 23 updates the operation data in the operation database device S together with the database control module 24 corresponds to an updating step according to the present invention. Further, the database clone generating module 23 generates the log information with respect to execution and commitment (that is to reflect executing result on the operation data in the database device S) of the transaction and hands over the log information to a log control module 25. It should be noted that the process through which the data base clone generating module 23 generates the log information with respect to the update corresponds to a second log information generating step according to the present invention. Further, the database clone generating module 23 secures memory 27 in DRAM 20d for cash in later processing. The log control module 25 generates a recovery log file 26 on the basis of the log information received from the database clone generating module 23.

Given next is an explanation of a content of a process executed by (the CPU 20b according to) the database clone generating module 23 of the replica-side control device 20 in the thus-configured database system. It is to be noted that the database clone generating module 23 executes the process whenever instructed to receive the differential log file 22 by the differential log file receiving module 21.

Figure 5:
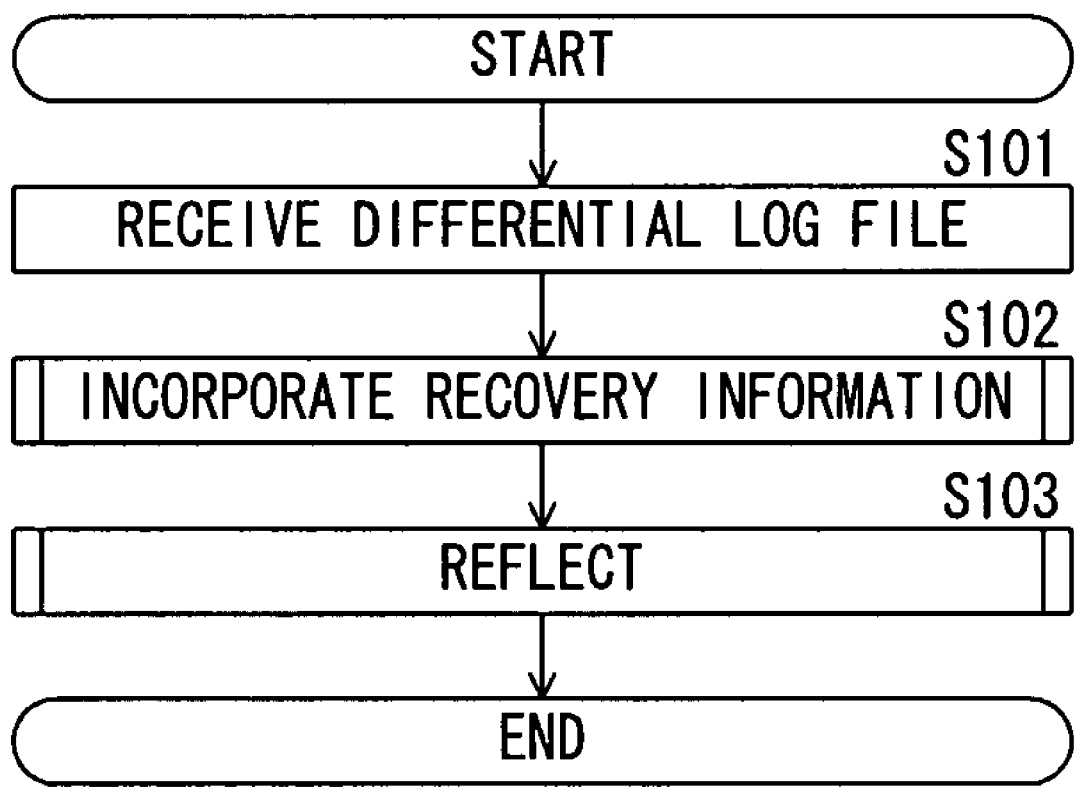
FIG. 5 is a flowchart showing a flow of processes executed by a database clone generating module of a replica-side control device.

FIG. 5 is a flowchart showing a flow of the process executed by the database clone generating module 23 of the replica-side control device 20.

After starting the process, in first step S101, the database clone generating module 23 executes a process of receiving the differential log file 22 from the differential log file receiving module 21.

In next step S102, the database clone generating module 23 executes a recovery information incorporating subroutine.

Figure 6:
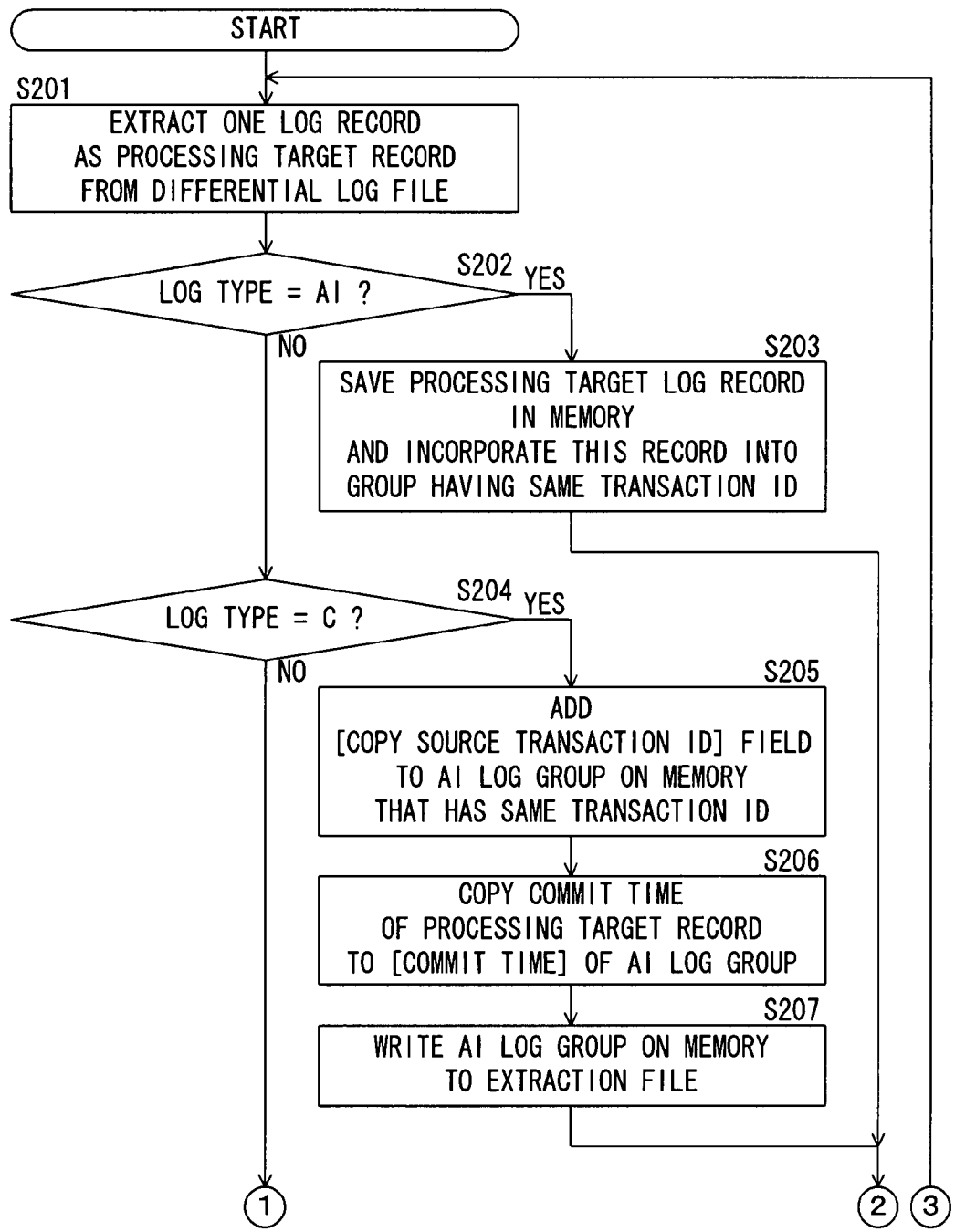
FIG. 6 is a flowchart showing a flow of a recovery information incorporating subroutine.
Figure 7:
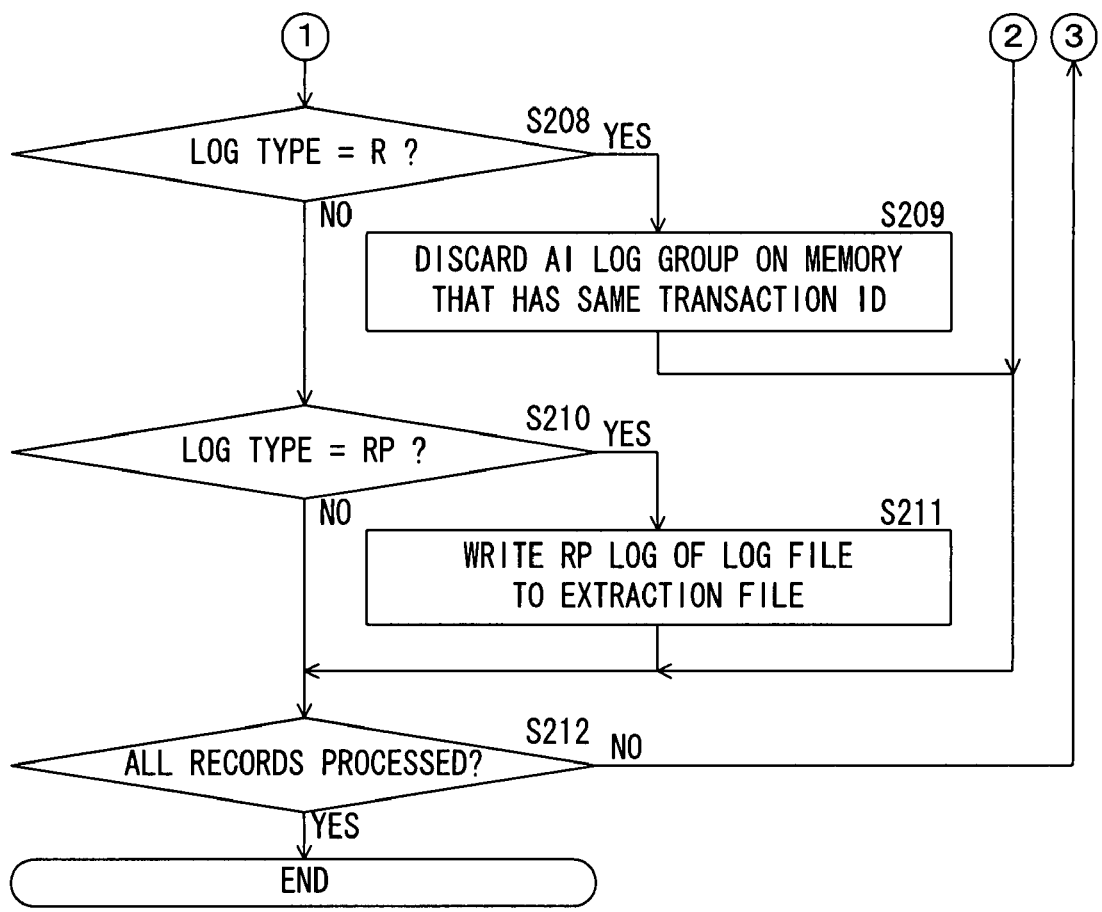
FIG. 7 is a flowchart showing a flow of the recovery information incorporating subroutine.

FIGS. 6 and 7 are flowcharts showing a flow of the recovery information incorporating subroutine.

After starting the recovery information incorporating subroutine, in first step S201, the database clone generating module 23 executes a process of extracting one of log records as a processing target record from the differential log file 22 received in step In next step S202, the database clone generating module 23 judges whether a value (log type) in the "log type" field of the processing target log record is "AI" or not.

Then, if the value (log type) in the "log type" field of the processing target log record is "AI", the database clone generating module 23 diverts the process from step S202 to step S203.

In step S203, the database clone generating module 23 executes a process of saving the log information recorded within the processing target log record into the memory 27. At this time, when this step S203 executed first, the database clone generating module 23 sets an exclusive area for the transaction ID of the processing target log record in the memory 27 and saving the log information. If a number of times this step S203 has been executed is more than one, the database clone generating module 23 searches for the exclusive area for transaction ID same as the processing target log record. If there is the exclusive area for the same transaction ID in the memory 27, the database clone generating module 23 stores the log information recorded within the processing target log record into the exclusive area. If there is not the exclusive area for the same transaction ID in the memory 27, the database clone generating module 23 sets an exclusive area for transaction ID of the processing target log record in the memory 27 and stores that in the processing target log record into the exclusive area. Thus, pieces of log information within "AI" log records are classified into groups by the transaction ID. After executing this process, the database clone generating module 23 advances the process to step S212.

On the other hand, in step S202, if the value (log type) in T he "log type" field of the processing target log record is not "AI", the database clone generating module 23 advances the process to step S204.

In step S204, the database clone generating module 23 judges whether the value (log type) in the "log type" field of the processing target log record is "C" or not.

Then, if the value (log type) in the "log type" field of the processing target log record is "C", the database clone generating module 23 diverts the process from step S204 to step S205.

In step S205, the database clone generating module 23 executes a process of adding a "copy source transaction ID" field to each pieces of the log information on the memory 27 having the same transaction ID as the processing target log record, and storing the transaction ID of the processing target log record in the added "copy source transaction ID" field of each pieces of the log information.

In next step S206, the database clone generating module 23 executes a process of copying the commit time of the processing target log record into the "commit time" field of each pieces of the log information on the memory 27 having the same transaction ID as that in the processing target log record.

In next step S207, the database clone generating module 23 executes a process of merging pieces of the log information on the memory 27 having the same transaction ID as the processing target log record, as an "extraction" file having a table structure. Note that FIG. 8 shows one example of a data structure of the extraction file 23a. Herein, in the present embodiment, a means for temporarily storing the log information involves the extraction file 23a but it is not limited to data file for the purpose. For example, such a temporarily storing means may also be a predetermined fixed area on the DRAM 20d to which those log information are written. After executing this process, the database clone generating module 23 advances the process to step S212.

While on the other hand, in step S204, if value (log type) in the "log type" field of the processing target log record is not "C", the database clone generating module 23 advances the process to step S208.

In step S208, the database clone generating module 23 judges whether the value (log type) in the "log type" field of the processing target log record is "R" or not.

Then, if the value (log type) in the "log type" field of the processing target log record is "R", the database clone generating module 23 diverts the process from step S208 to step S209.

In step S209, the database clone generating module 23 executes a process of deleting pieces of the log information on the memory 27 having the same transaction ID as the processing target log record. After executing this process, the database clone generating module 23 advances the process to step S212.

While on the other hand, in step S208, if value (log type) in the "log type" field of the processing target log record is not "R", the database clone generating module 23 advances the process to step S210.

In step S210, the database clone generating module 23 judges whether the value (log type) in the "log type" field of the processing target log record is "RP" or not.

Then, if the value (log type) in the "log type" field of the processing target log record is "RP", the database clone generating module 23 diverts the process from step S210 to step S211.

In step S211, the database clone generating module 23 executes a process of adding the log information recorded within the processing target log record into the extraction file 23a. After executing this process, the database clone generating module 23 advances the process to step S212.

On the other hand, in step S210, if the value (log type) in the "log type" field of the processing target log record is not "RP", the database clone generating module 23 advances the process to step S212.

In step S212, the database clone generating module 23 judges whether the processes as to all the log records within the differential log file 22 received in step S101 are finished or not.

Then, if the processes as to all the log records within the differential log file 22 received in step S101 are not finished, the database clone generating module 23 diverts the process from step S212 and loops the process back to step S201. Whereas if it is judged that the processes as to all the log records within the differential log file 22 received in step S101 are finished in step S212, the database clone generating module 23 terminates the extraction subroutine shown in FIGS. 6 and 7 and advances the process to step S103 in FIG. 5.

In step S103, the database clone generating module 23 executes a reflection subroutine.

Figure 9:
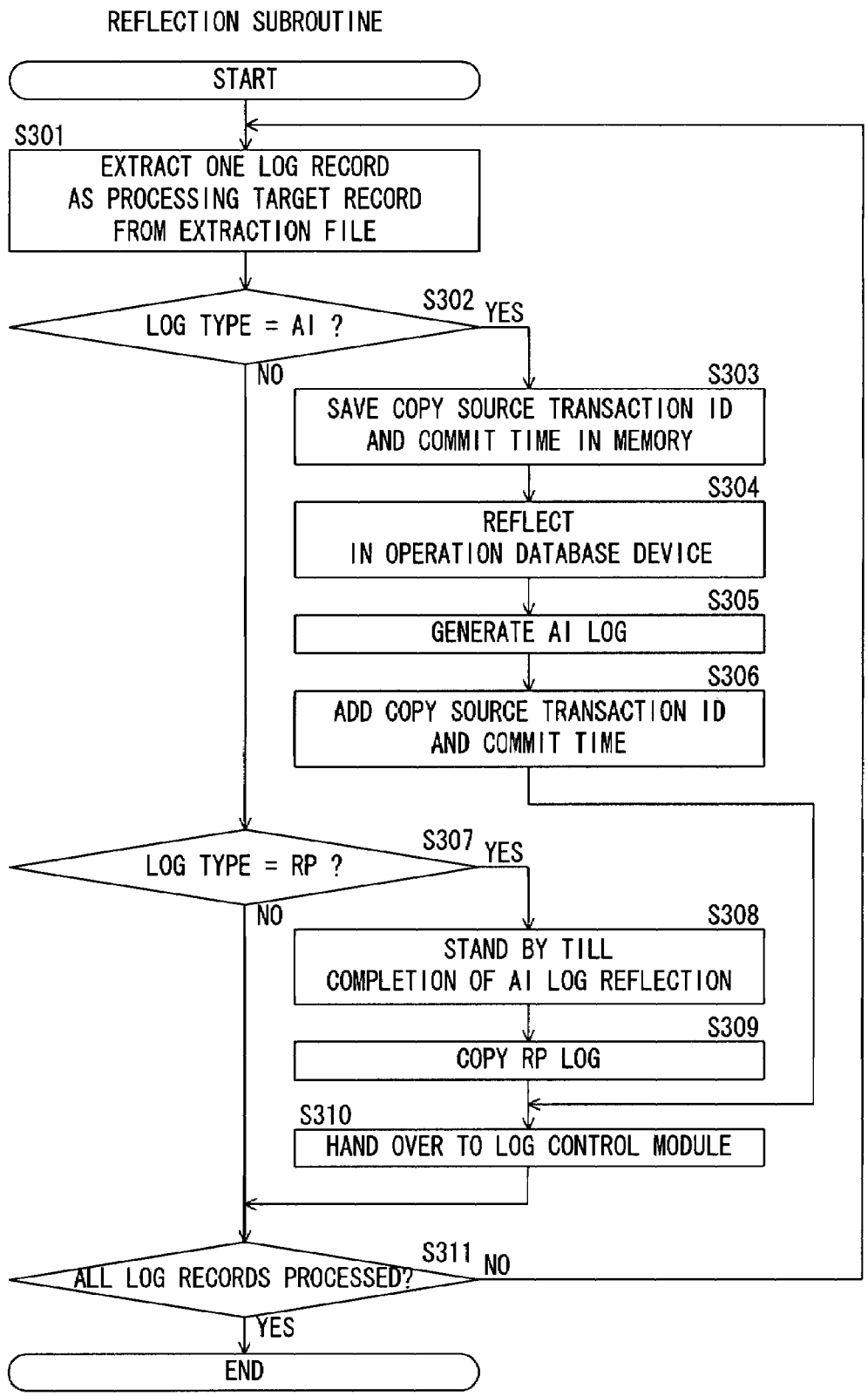
FIG. 9 is a flowchart showing a flow of a reflection subroutine.

FIG. 9 is a flowchart showing a flow of the reflection subroutine.

After starting the reflection subroutine, in first step S301, the database clone generating module 23 executes a process of extracting one of the log records as a processing target record from the extraction file 23a in FIG. 8.

In next step S302, the database clone generating module 23 judges whether the value (log type) in the "log type" field of the processing target log record is "AI" or not.

Then, if the value (log type) in the "log type" field of the processing target log record is "AI", the database clone generating module 23 diverts the process from step S302 to step S303.

In step S303, the database clone generating module 23 executes a process of saving, in the memory 27, the values in the "copy source transaction ID" field and in the "commit time" field of the processing target log record.

In next step S304, the database clone generating module 23 instructs the operation database device S to update (add, delete or change) the operation data on the basis of the transaction specified by the information stored in the processing target log record with the cooperation of the database control module 24.

In next step S305, the database clone generating module 23 executes a process of generating the log information with respect to the update of the operation data by the operation database device S in accordance with the instruction in step S304.

In next step S306, the database clone generating module 23 executes a process of incorporating the copy source transaction ID and the commit time, which have been saved in the memory 27 in step S303, into the log information generated in step S305. Further, the database clone generating module 23 also executes a process of committing the transaction specified by the information stored in the processing target log record with the cooperation of the database control module 24 at timing tuned by the user. Further, the database clone generating module 23 executes, as an extension of this committing process, a process of generating the log information with respect to the establishment of updating operation data by the operation database device S in accordance with the instruction in step S304 (though, the log information is not illustrated). Then, the database clone generating module 23 advances the process to step S310.

On the other hand, in step S302, if the value (log type) in the "log type" field of the processing target log record is not "AI", the database clone generating module 23 advances the process to step S307.

In step S307, the database clone generating module 23 judges whether the value (log type) in the "log type" field of the processing target log record is "RP" or not.

Then, if the value (log type) in the "log type" field of the processing target log record is "RP", the database clone generating module 23 diverts the process from step S307 to step S308.

In step S308, the database clone generating module 23 wait until an end of updating the operation data within the operation database device S that has been conducted via the database control module 24 in step S304, and, after finishing the update, advances the process to step S309.

In step S309, the database clone generating module 23 performs a process of generating the log information of the recovery point on the basis of the processing target log record, and advances the process to step S310.

In step S310, the database clone generating module 23 executes a process of handing over the log information generated in step S306 or S309 to the log control module 25.

Then, the log control module 25 generates the recovery log file 26 on the basis of the log information received from the database clone generating module 23. Now, FIG. 10 is a table showing one example of a data structure of the recovery log file 26. The database clone generating module 23 hands over the log information to the log control module 25 and thereafter advances the process to step S311.

While on the other hand, in step S307, if the value (log type) in the "log type" field of the processing target log record is not "RP", the database clone generating module 23 advances the process to step S311.

In step S311, the database clone generating module 23 judges whether the processes as to all the log records within the extraction file 23a are finished or not.

Then, if the processes as to all the log records within the extraction file 23a are not finished, the database clone generating module 23 diverts the process from step S311 and loops the process back to step S301.

Whereas if the processes as to all the log records within the extraction file 23a are finished in step S311, the database clone generating module 23 terminates the reflection subroutine shown in FIG. 9 and also finishes the process shown in FIG. 5.

It should be noted that the process through which the database clone generating module 23 executes the process shown in FIG. 5 corresponds to a storing step according to the present invention.

Next, an action and an effect of the database system in the present embodiment will be explained.

In the database system according to the present embodiment, in the normal state where there is no disaster etc, the control device 10 at the main center accumulates, in the recovery log file 14, the log information on the update of the operation data executed by, the operation database device M, and generates and transmits, to the control device 20 at the sub-center, the differential log file 22 based on the accumulated log information in order the operation database device S at the sub-center update the operation data as in the main center. At this time, the log information specifying the recovery point is incorporated into the table of the recovery log file 14. In case plural pieces of transaction are sectioned into several blocks of transaction on the operation terminal computers T should continually execute, the log information indicating the recovery point is inserted in an interval between the blocks.

The control device 20 at the sub-center, when receiving the differential log file 22, reconstructs transaction based on log information (except log information indicating recovery point) in the differential log file 22 and instructs the operation database device S update the operation data on the basis of commit of the reconstructed transaction, and accumulates the log information in the recovery log file 26 as log records. The log information specifying the recovery point is also incorporated into this recovery log file 26 and is, in the same way as in the recovery log file 14 of the main center, incorporated at the intervals between the blocks of the operations.

Then, if the operation database device M gets into an unusable state due to occurrence of the natural disaster, the power failure or the system fault, the database system according to the present embodiment can restore the operation database device M at the main center in the following procedures.

Figure 11:
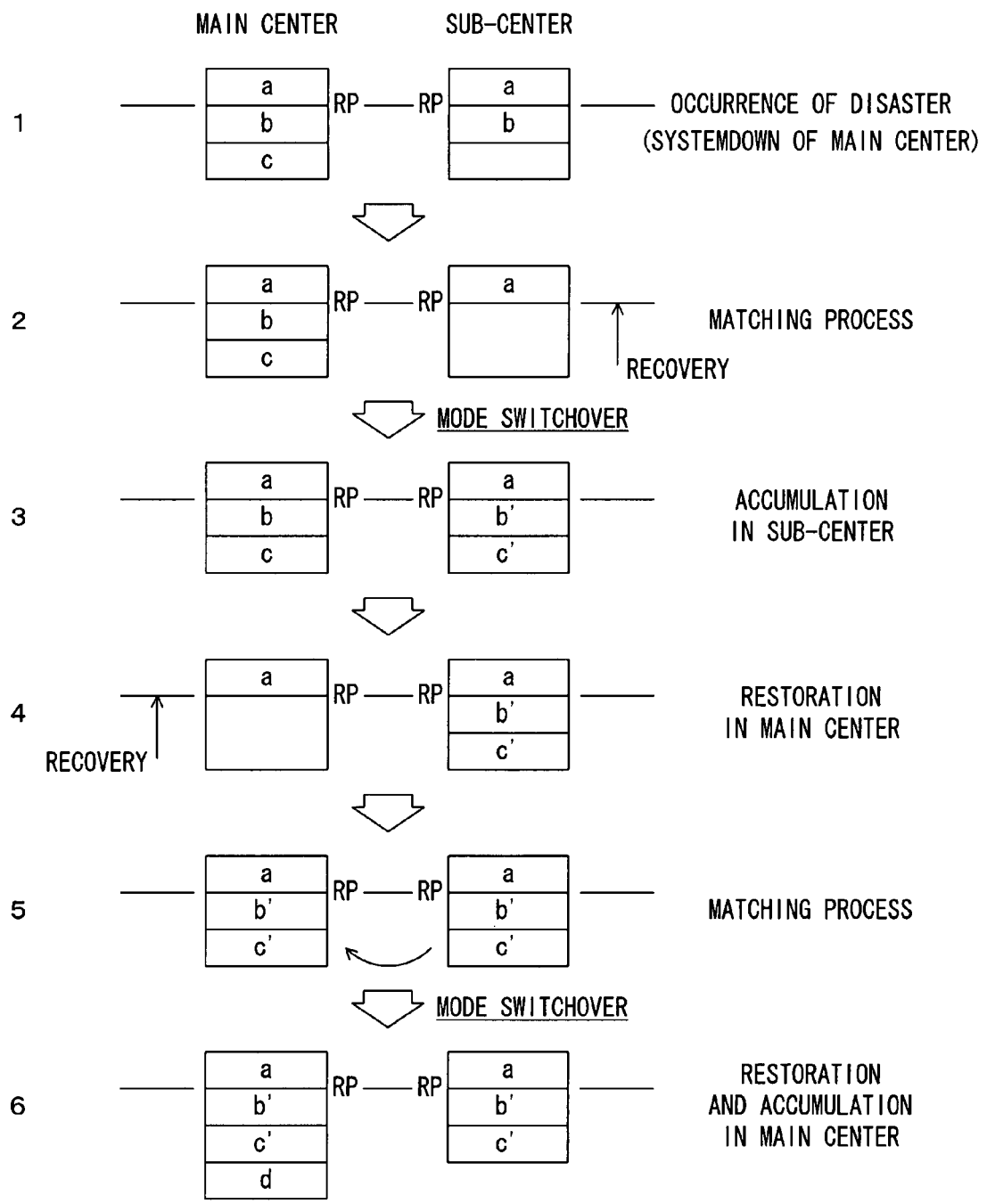
FIG. 11 is an explanatory diagram schematically showing how an operation database device is, after getting unusable due to occurrence of disaster etc at the main center, restored to an operation enabled state.

FIG. 11 is an explanatory diagram schematically showing how the operation database device M is, after getting into the unusable state due to occurrence of the disaster etc at the main center, restored to an available state.

To start with, a first phase shows that pieces of log records a, b, c are accumulated in the recovery log file 14 of the main center, while the pieces of log records a and b are accumulated in the recovery log file 26 of the sub-center. Note that the recovery point is set between the piece of log records a and the piece of log records b in the recovery log file 14 of the main center and is, by the function described above, propagated to between the piece of log records a and the piece of log records b in the recovery log file 26 of the sub-center. In this first phase, if the operation database device M gets into the unusable state due to occurrence of the disaster etc at the main center, it comes to a second phase in which the user takes a matching up the operation on operation terminal computers T to the operation data accumulated in the operation database device S by recovering a state of the operation data in the operation database device S to a state specified by the recovery point on the basis of the recovery log file 26 of the sub-center and then switches over the current movement database device from the operation database device M at the main center to the operation database device S at the sub-center.

After switching over the current movement database device, in the third phase, the operation terminal computer T becomes accessible to the control device 20 at the sub-center, and the recovery log file 26 of the sub-center starts being accumulated with the log record recording the log information. Then, immediately after this start, the control device 10 and the operation database device M at the main center can be repaired or can undergo maintenance.

Thereafter, when the control device 10 and the operation database device M at the main center become the usable state, it comes to a fourth phase wherein the user recovers a state of the operation data in the operation database device M to a state specified by the recovery point on the basis of the recovery log file 14 of the main center. Herein, in the conventional operation database device, in the case of transferring (mirroring) the operation data accumulated at the sub-center to the operation database device M at the main center, all the items of operation data must be copied, however, in many cases, even when repairing the operation database device M at the main center or carrying out the maintenance of this operation database device M, the operation data in the operation database device M remain without being broken. On the contrary, according to the present embodiment, when restoration is performed with the main center, the recovery point is designated without copying all the items of operation data, the recovery of the database device M is made up to a state where matching process is possible.

After the recovery on the side of the main center, as a fifth phase, a transferring (mirroring) the log information recorded in log record b' and c' (in FIG. 11) accumulated in the differential log file 22 of the sub-center into the of main center is performed, and a matching up the operation on the operation terminal computer T to the operation data accumulated in the operation database device M is performed, and then the current movement database device is switched over from the operation database device S at the sub-center to the operation database device M at the main center. Then, such the operation on operation terminal computers T resumes using the operation database device M at main center as the current movement database device, and there also resumes the accumulation of the log information into the recovery log file 14 of the main center.

Figure 12:
FIG. 12 is a table showing one example of a data structure of the recovery log file of the main center.

It should be noted that in the database system according to the present embodiment, the recovery point is set in the recovery log file 14 of the main center and in the recovery log file 26 of the sub-center, however, as shown in FIGS. 12 through 14, none of the recovery point may be set. Even in this case, the commit time and date of the main center is copied to each log records in recovery log file 26 of the sub-center, and hence, in the recovery after occurrence of the disaster (the second phase) and in the recovery before being restored (the fifth phase), it is possible to control the recovery of the database device M and the recovery of the database device S and, besides, to simply perform the matching up a state of the operation data between the two database devices M, S at each centers as in the case of setting the recovery point.

What is clamed is:

1. A database system management method for managing a database system configured by a main center system including a first processing device which generates operation data by executing a transaction constituting an operation according to a request that has been sent via a network from any one of a plurality of operation terminal computers in a normal state and including a first database device which stores the operation data or updates the stored data by new operation data every time new operation data are generated, and a sub-center system including a second processing device and a second database device respectively including the same functions as said first processing device and said first database device, said method comprising:

first log information generating, in which said first processing device generates, whenever the operation data are updated within said first database device, its log information as first log information;

incorporating in which said first processing device incorporates predetermined first delimiter information into an interval between two consecutive arbitrary pieces of first log information generated in said first log information generating;

transmitting in which said first processing device transmits the series of first log information into which the delimiter information is incorporated in said incorporating to said second processing device;

updating in which said second processing device divides the series of first log information transmitted in said transmitting into plural groups and executes, for each of the plural groups, update of the operation data stored in said second database device on the basis of the respective first log information constituting the group;

second log information generating, in which said second processing device generates, whenever the operation data are updated in said second database device in said updating, its log information as second log information; and storing in which said second processing device incorporates second delimiter information associated with the first delimiter information into an interval corresponding to the interval within the series of second log information generated in said second log information generating and stores the series of the second log information in which the second delimiter information is incorporated.

2. A database system management method according to claim 1, wherein the predetermined first delimiter information is incorporated into an interval designated by any one of said operation terminal computers among intervals within the series of first log information.

3. A database system management method for operating a database system configured by a main center system including a first processing device which generates operation data by executing a transaction constituting an operation according to a request that has been sent via a network from any one of a plurality of operation terminal computers in a normal state and including a first database device which stores the operation data or updates the stored data by new operation data every time new operation data are generated, and a sub-center system including a second processing device and a second database device respectively including the same functions as said first processing device and said first database device, said method comprising:

first log information generating, in which said first processing device generates, whenever the operation data are updated within said first database device, its log information as first log information;

transmitting in which said first processing device transmits the pieces of first log information generated in said first log information generating to said second processing device;

updating in which said second processing device updates the operation data in said second database device on the basis of the first log information transmitted in said transmitting;

second log information generating, in which said second processing device generates, whenever the operation data are updated in said second database device in said updating, its log information as second log information; and associating in which said second processing device associates the second log information generated in said second log information generating with the first log information by adding time information contained in the first log information to each piece of second log information.

4. A database system management method according to claim 1 or 3, wherein said first processing device generates, in said first log information generating, if a transaction of which an executing result should be reflected on plural database tables included in said first database device, the log information for each of those database tables.

5. A database system configured by a main center system including a first processing device which generates operation data by executing transaction constituting an operation according to request that has been sent via a network from any one of a plurality of operation terminal computers in a normal state and including a first database device which stores the operation data or updates the stored data by new operation data every time new operation data are generated, and a sub-center system including a second processing device and a second database device respectively including the same functions as said first processing device and said first database device, said first processing device comprising:

a first log information generating unit generating, each time the operation data are updated within said first database device, update log information thereof as first log information;

an incorporating unit incorporating predetermined first delimiter information into an interval between two consecutive arbitrary first log informations generated by said first log information generating unit; and a transmitting unit transmitting the respective pieces of first log information into which the delimiter information is incorporated by said incorporating unit to said second processing device; and said second processing device comprising:

an updating unit dividing the series of first log information transmitted by said transmitting unit into plural groups and executing, for each of the plural groups, update of the operation data stored in said second database device on the basis of the respective first log information constituting the group;

a second log information generating unit generating, whenever the operation data are updated in said second database device by said updating unit, its log information as second log information; and a storing unit incorporating second delimiter information associated with the first delimiter information into an interval corresponding to the interval within the series of second log information generated by said second log information generating unit and storing the series of the second log information in which the second delimiter information is incorporated.

* * * * *